(12) United States Patent
Park et al.

(10) Patent No.: US 6,462,793 B1
(45) Date of Patent: Oct. 8, 2002

(54) LIQUID CRYSTAL DISPLAY DEVICE AND METHOD OF FABRICATING THE SAME

(75) Inventors: Jae Deok Park; Yong Min Ha, both of Anyang-shi (KR)

(73) Assignee: LG. Philips LCD Co., Ltd., Seoul (KR)

( * ) Notice: Subject to any disclaimer, the term of this patent is extended or adjusted under 35 U.S.C. 154(b) by 144 days.

(21) Appl. No.: 09/698,156

(22) Filed: Oct. 30, 2000

(30) Foreign Application Priority Data

Oct. 28, 1999 (KR) .......................................... P99-47296

(51) Int. Cl.$^7$ ............................................... G02F 1/136
(52) U.S. Cl. ........................................... 349/42; 257/57
(58) Field of Search ............................. 349/42, 43, 39; 257/59, 72; 385/147

(56) References Cited

U.S. PATENT DOCUMENTS

| | | | |
|---|---|---|---|
| 5,166,085 A | * 11/1992 | Wakai et al. | 257/59 |
| 5,334,859 A | * 8/1994 | Matsuda | 257/347 |
| 5,576,556 A | * 11/1996 | Takemura et al. | 257/344 |
| 5,641,974 A | * 6/1997 | den Boer et al. | 257/59 |
| 5,780,871 A | * 7/1998 | den Boer et al. | 257/258 |
| 5,994,721 A | * 11/1999 | Zhong et al. | 257/440 |
| 6,069,019 A | * 5/2000 | Ishii et al. | 438/158 |
| 6,219,113 B1 | * 4/2001 | Takahara | 345/98 |
| 6,307,215 B1 | * 10/2001 | den Boer et al. | 257/59 |
| 6,365,916 B1 | * 4/2002 | Zhong et al. | 257/59 |
| 6,376,270 B1 | * 4/2002 | Gu et al. | 438/155 |

* cited by examiner

*Primary Examiner*—Akm E. Ullah
(74) *Attorney, Agent, or Firm*—McKenna Long & Aldridge LLP

(57) ABSTRACT

A liquid crystal display device that is adapted to prevent a short defect between a gate metal film and a data metal film generated from an insulation breakage of an insulating film caused by a static electricity. In the device, a gate metal film is formed at the center of a semiconductor layer with being interleaved with a first insulating film. A connecting metal film is connected to the gate metal film and is formed at a substrate. A second insulating film covers the gate metal film and the connecting metal film and is provided with a first contact hole to expose a part of each side surface of the semiconductor layer and the center portion of the connecting metal film. A data metal film is provided on the second insulating film contacting the semiconductor layer by way of the first contact hole formed in each side surface of the semiconductor layer. A third insulating film covers the data metal film and the second insulating film and is provided with a second contact hole to expose a part of the data metal film and the center portion of the connecting metal film. A pixel electrode is provided on the third insulating film by way of the second contact hole. The connection parts exposed by the first and second contact holes are separated from each other.

7 Claims, 17 Drawing Sheets

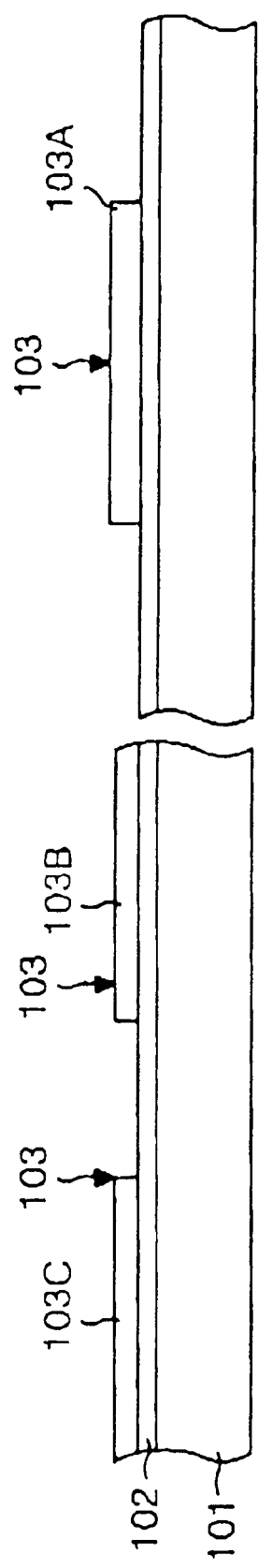

LIQUID CRYSTAL DISPLAY DEVICE AND METHOD OF FABRICATING THE SAME

This application claims the benefit of Korean Patent Application No. 1999-47296, filed on Oct. 28, 1999, which is hereby incorporated by reference for all purposes as if fully set forth herein.

BACKGROUND OF THE INVENTION

1. Field of the Invention

This invention relates to a technique for preventing a defect caused by static electricity in a process of fabricating a substrate of a liquid crystal display, and more particularly a method of fabricating a liquid crystal display wherein gate metal film patterns are connected to each other by a connecting pattern, and thereafter the connection of the gate metal film is separated when a data metal film pattern and/or an indium tin oxide (ITO) film pattern are formed so as to prevent an insulation breakage of a gate insulating film caused by a static electricity in a process of depositing the gate insulating film.

2. Description of the Related Art

Generally, as shown in FIG. 1, a liquid crystal display (LCD) has thin film transistors (TFT's) 25 arranged at each intersection between gate bus lines 20 and data bus lines 30. Each of pixel electrodes 40 provided at an area surrounded by a gate bus line 20 and a data bus line 30 is connected to each output terminal a corresponding one of the TFT's 25. A gate driver 21 for driving the gate bus lines 20 is connected to the ends of the gate bus lines 20, and a data driver 31 for driving the data bus lines 30 is connected to the ends of the data bus lines 30.

The gate driver 21 and the data driver 31 have employed a structure in which devices such as TFT's are provided at the peripheral of a pixel array of the substrate in accordance with a development of an integrated circuit technique. FIG. 2 shows an example of the conventional driver circuit for driving one line. In FIG. 2, the driver circuit is configured by a serial and parallel combination of six TFT's. Herein, a is a terminal connected to one gate line, and b1, b2, b3 and b4 are connecting terminals of the driver circuit.

FIG. 4 is a plan view showing an exemplary structure of a conventional LCD substrate including the driver circuit. The LCD substrate includes a pixel array provided with gate bus lines 20, data bus lines 30, pixel electrodes 40 and TFT's 25, and a driver circuit 16. In FIG. 4, a reference numeral 17 represents a gate start lead line.

Hereinafter, a process of fabricating the conventional LCD substrate will be described in detail with reference to FIG. 3, FIG. 5 and FIG. 6. FIG. 5 and FIG. 6 are section views of the LCD substrate taken along the I–I' line and the II–II' line in FIG. 4, respectively.

First, a buffer layer is provided on a transparent substrate 1 and an amorphous silicon (a-Si) layer is formed into a land-shaped pattern on the buffer layer 2 to provide a semiconductor layer 3. In turn, a first insulating film 4 made from $SiN_x$ or $SiO_x$ and a gate metal film 5 made from Cr, Mo or Al are sequentially disposed and then patterned into the same pattern shape. A gate electrode 20a constituting a portion of the gate metal film is formed into a narrower width than the land-shaped semiconductor layer 3 at a portion where TFT is formed by way of the first insulating film 4 on the semiconductor layer 3. Particularly, the pattern of the gate metal film 5 is formed in such a manner that the array gate bus line 20, the gate electrode 20a, the driver gate bus line 42, the gate start lead line 17 are separated from each other. Next, an ohmic contact layer is formed by doping each side surface of the semiconductor layer with impurity ions using the patterned gate metal film 5 as a mask.

Subsequently, a second insulating film 7 made from $SiN_x$ or $SiO_x$ is deposited as shown in FIG. 7A. Since the gate metal film 5 constituting the gate electrode 2a, etc. has been floated in a deposition process of the second insulating film 7 and exposed to a plasma in a deposition equipment, a potential difference caused by a static electricity is generated at the separated gate metal film 5, that is, between the array gate bus line 20 and the driver gate bus line 42. Thus, an insulation breakage may be caused on the second insulating film 4 to form a gap 50 in the second insulating film 7.

If a first contact hole 11 for exposing each side surface of the semiconductor layer 3 is formed in the second insulating film 7 in such a state that the gap 50 has been formed in the second insulating film 7 as mentioned above, then an etchant is penetrated through the gap 50 to damage the gate metal film 5. Also, if the data metal film 43 is formed on the second insulating film 7, then a short may be generated between the gate metal film 5 and the data metal film 43 through the 50.

Subsequently, the data metal film 43 is formed into a desired pattern to provide data bus lines 30, source electrodes 30a and a data metal film 8 of the driver. By the pattern formation of the data metal film 43, the TFT's 25 are provided at the pixel array 15 and the driver circuit 16 of the LCD substrate.

Finally, a third insulating film 9 made from an inorganic insulating material5 such as $SiN_x$ or $SiO_x$ or an organic insulating material such as polyimide is deposited and a second contact hole 12 is formed to expose a partial surface of the drain electrode 30b of the TFT included in the pixel array. Thereafter, an ITO film is provided at the entire surface of the third insulating film 9 and then patterned to form the pixel electrode 40 of the pixel array.

As described above, the edge of the LCD substrate provided with the driver circuit has such a structure that the TFT's are arranged as shown in FIG. 6 and then the third protective film 9 is provided to cover the TFT's, whereas the pixel array thereof has such a structure that the TFT's are arranged as shown in FIG. 5 and then the pixel electrodes 40 contacting the drain electrodes of the TFT's are provided.

SUMMARY OF THE INVENTION

Accordingly, the present invention is directed to a liquid crystal display device and method of fabricating the same that substantially obviates one or more of the problems due to limitations and disadvantages of the related art.

An object of the present invention to provide a method of fabricating a liquid crystal display device that is adapted for preventing an insulation breakage of an insulating film caused by a static electricity.

A further object of the present invention is to provide a method of fabricating a liquid crystal display device that is adapted for preventing a short between a gate metal film and a data metal film caused by an insulation breakage of an insulating film.

A still further object of the present invention is to provide a method of fabricating a liquid crystal display device that is adaptive for preventing a damage of a gate metal film caused by an insulation breakage of an insulating film.

A still further object of the present invention is to provide a method of fabricating a liquid crystal display device that is adaptive for preventing an insulation breakage of an insulating film as well as improving a fabrication yield of a liquid crystal display device without any additional mask process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, a liquid crystal display device according to one aspect of the present invention includes a gate metal film formed at the center of a semiconductor layer with being interleaved with a first insulating film; a connecting metal film connected to the gate metal film and formed at a substrate; a second insulating film covering the gate metal film and the connecting metal film and provided with a first contact hole to expose a part of each side surface of the semiconductor layer and the center portion of the connecting metal film; a data metal film provided on the second insulating film contacting the semiconductor layer by way of the first contact hole formed in each side surface of the semiconductor layer; a third insulating film covering the data metal film and the second insulating film and provided with a second contact hole to expose a part of the data metal film and the center portion of the connecting metal film; and a pixel electrode provided on the third insulating film by way of the second contact hole, said connection parts exposed by the first and second contact holes being separated from each other.

A method of fabricating a liquid crystal display device according to another aspect of the present invention includes the steps of patterning a first metal film to form a gate metal film and a connecting metal film for connecting the gate metal film; forming an insulating film to cover the gate metal film and the connecting metal film, and forming a first contact hole in the insulating film to expose at least one surface of the connecting metal film; forming a second metal film on the insulating film provided with the first contact hole, and patterning the second metal film to provide a data metal film and, at the same time, to etch and primarily separate the connecting metal film by an etchant for the data metal film; forming a protective insulating film on the data metal film, and forming a second contact hole on the protective insulating film to expose a partial surface of the data metal film and the separated area of the connecting metal film, and forming a third metal film on the protective insulating film provided with the second contact hole, and patterning the third metal film to provide a pixel electrode connected to the data metal film and, at the same time, to secondarily separate the separated part of the connecting metal film by an etchant for the pixel electrode.

A method of fabricating a liquid crystal display device according to still another aspect of the present invention includes the steps of forming a land-shaped semiconductor layer on a substrate; disposing a first insulating film and a first metal film on the substrate provided with the semiconductor layer, and patterning the first insulating film and the first metal film into almost identical shape to provide a connecting metal film for connecting the first metal film to the gate metal film in such a manner that at least part of the gate metal film is interleaved with the first insulating film to be overlapped with the center portion of the semiconductor layer; doping each side surface of the semiconductor layer with impurity ions using the gate metal film and the connecting metal film as a mask; forming a second insulating film on the substrate in which the semiconductor layer is doped with the impurity ions; forming a first contact hole in the second insulating film to expose each side surface of the semiconductor layer doped with the impurity ions and a partial surface of the connecting metal film; forming a second metal film on the substrate provided with the first contact hole and then etching the same to form a pattern of the data metal film contacting the semiconductor layer doped with the ions and, at the same time, etching the exposed part of the connecting metal film to separate the connecting metal film; forming a third insulating film on the substrate in which the connecting metal film has been separated, and forming a second contact hole in the third insulating film at a part of the data metal film and the separated area of the connecting metal film; and forming a third metal film on the third insulating film provided with the second contact hole and then etching the same to provide a pattern of the pixel electrode contacting a part of the data metal film, and making an additional etching of the separated connecting metal film.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENT

Reference will now be made in detail to the preferred embodiment of the present invention, an example of which is illustrated in the accompanying drawings.

A fabrication process of a liquid crystal display (LCD) substrate according to an embodiment of the present invention will be described with reference to FIG. 8, FIG. 9, FIGS. 10A to 10E and FIGS. 11A to 11E.

Figure 1:
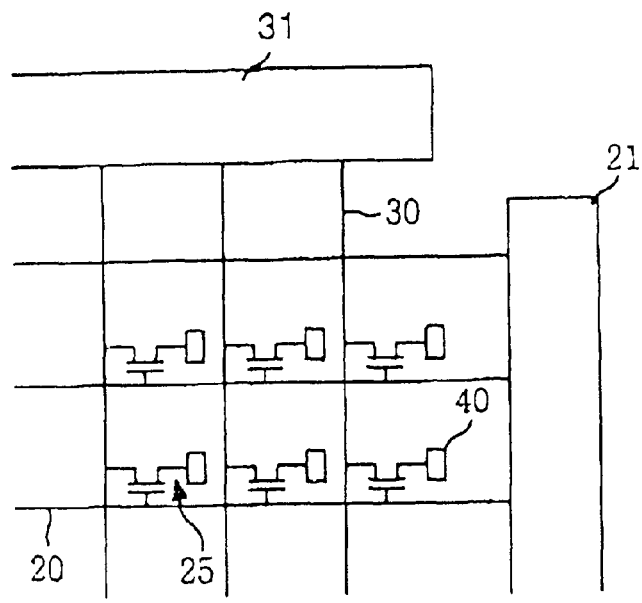
FIG. 1 is a schematic diagram showing a driving circuit of a conventional liquid crystal display device.
Figure 2:
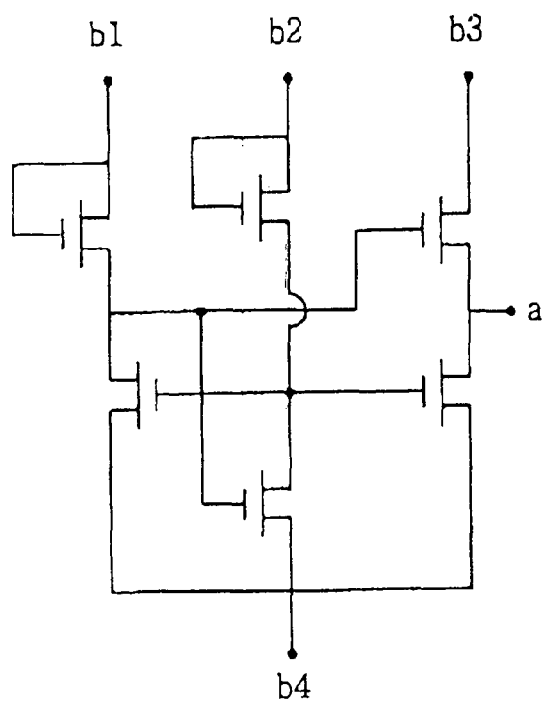
FIG. 2 is a circuit diagram of an example of a driver for driving the circuit of FIG. 1.
Figure 3:
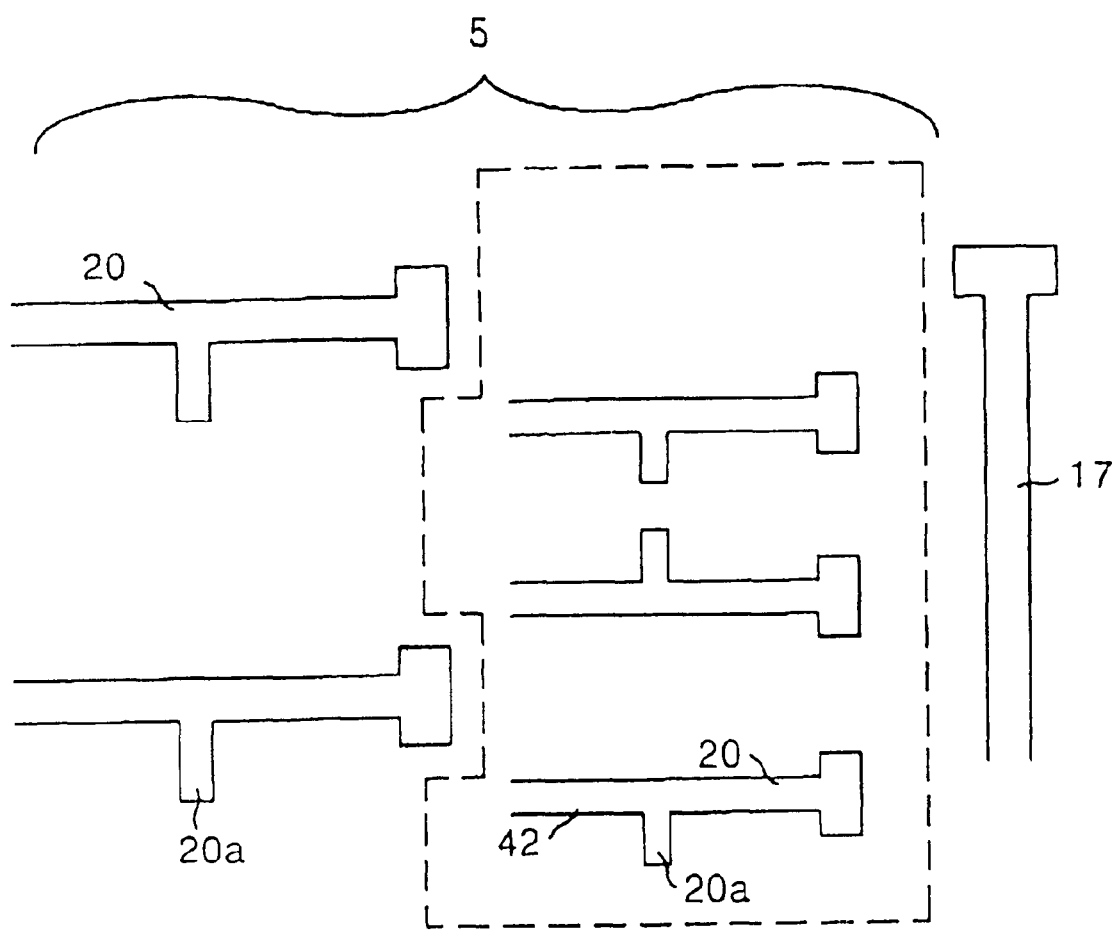
FIG. 3 is a plan view showing a conventional pattern shape of a gate metal for configuring the driving circuit of the liquid crystal display device in FIG. 1.
Figure 4:
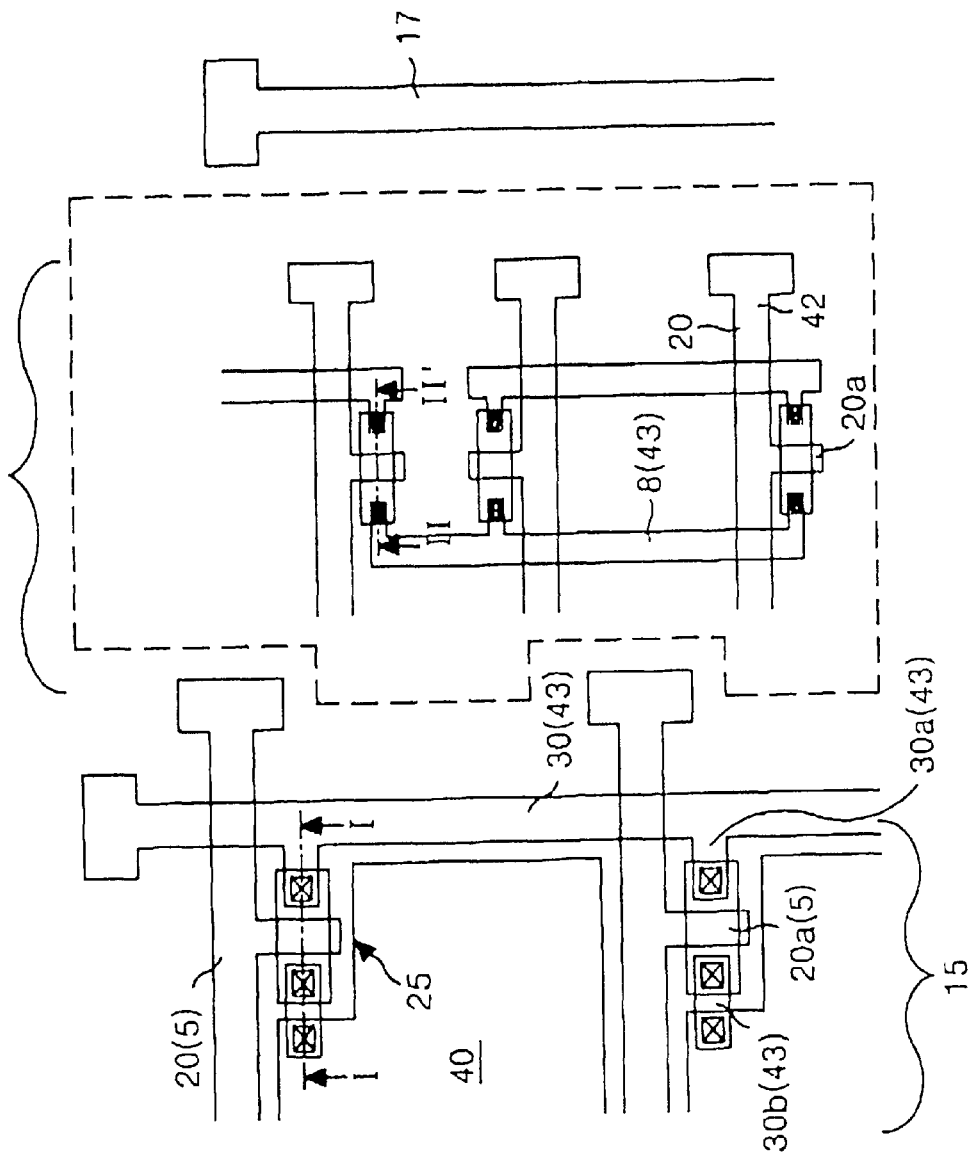
FIG. 4 is a plan view showing a configuration of a substrate of a liquid crystal display in which conventional patterns of a gate metal and a data metal, etc. for configuring the driving circuit of the liquid crystal display device in FIG. 1 are provided.
Figure 5:
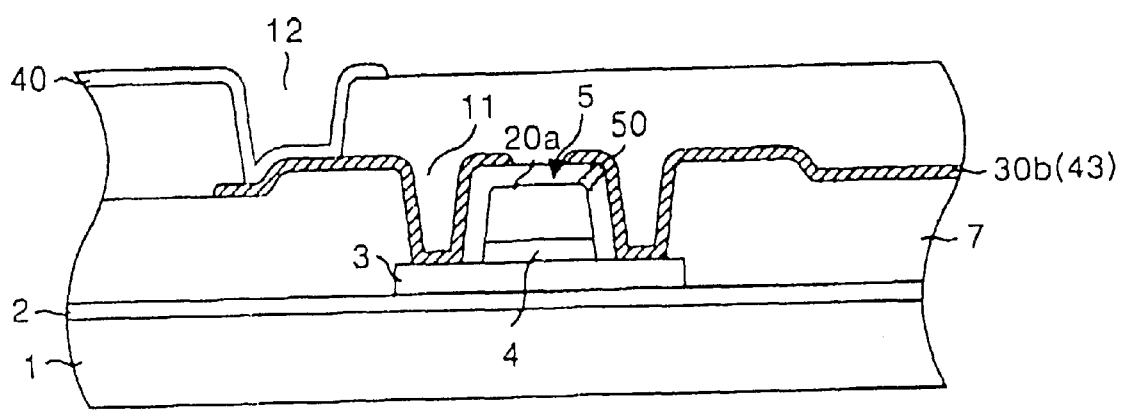
FIG. 5 is a section view of the liquid crystal display substrate taken along the line I–I' in FIG. 4.
Figure 6:
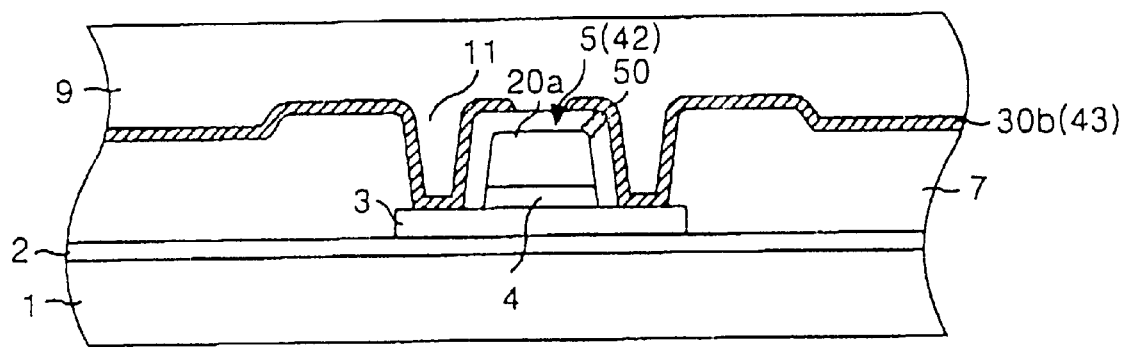
FIG. 6 is a section view of the liquid crystal display substrate taken along the line II–II' in FIG. 4.
Figure 7A:
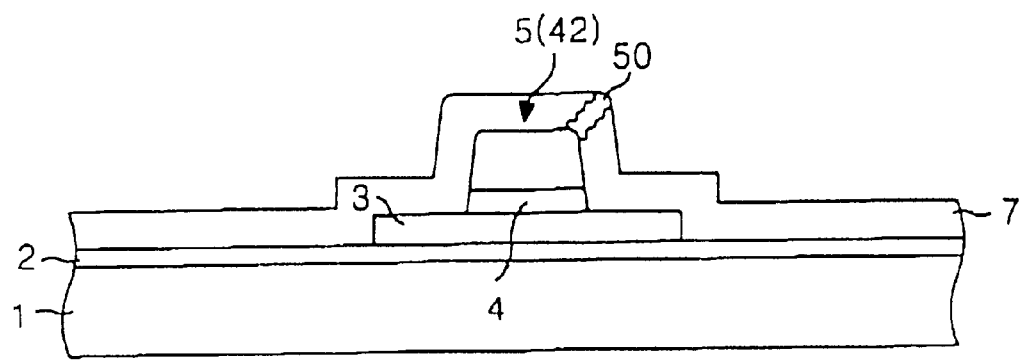
FIG. 7A and FIG. 7B are section views for explaining a static electricity defect generated in a conventional fabrication process of a liquid crystal display device.
Figure 7B:
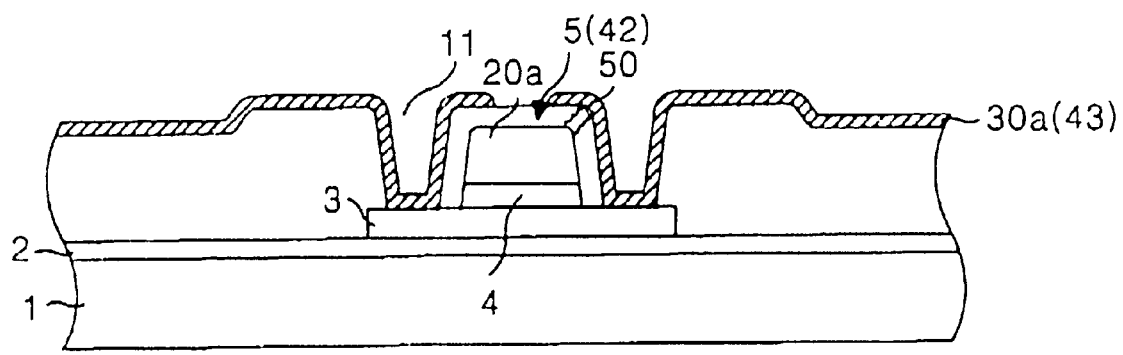
Figure 8:
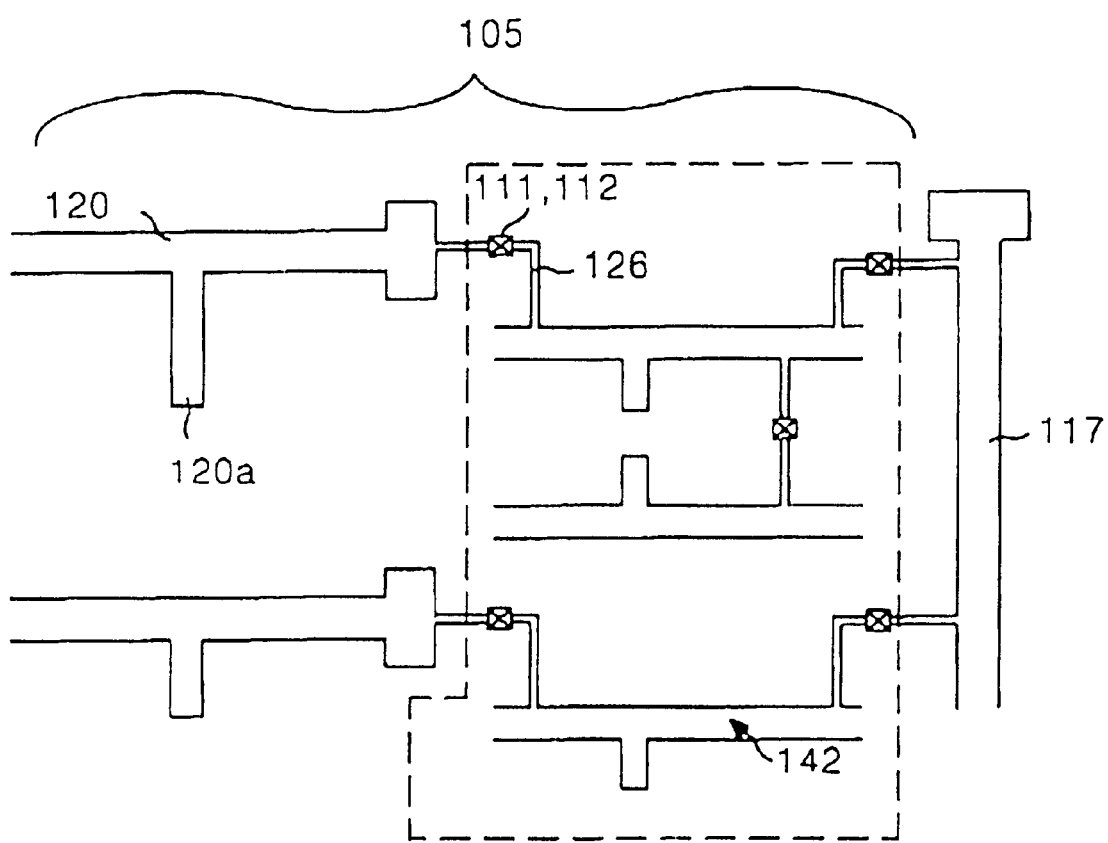
FIG. 8 is a plan view showing a pattern shape of a gate metal according to an embodiment of the present invention.
Figure 9:
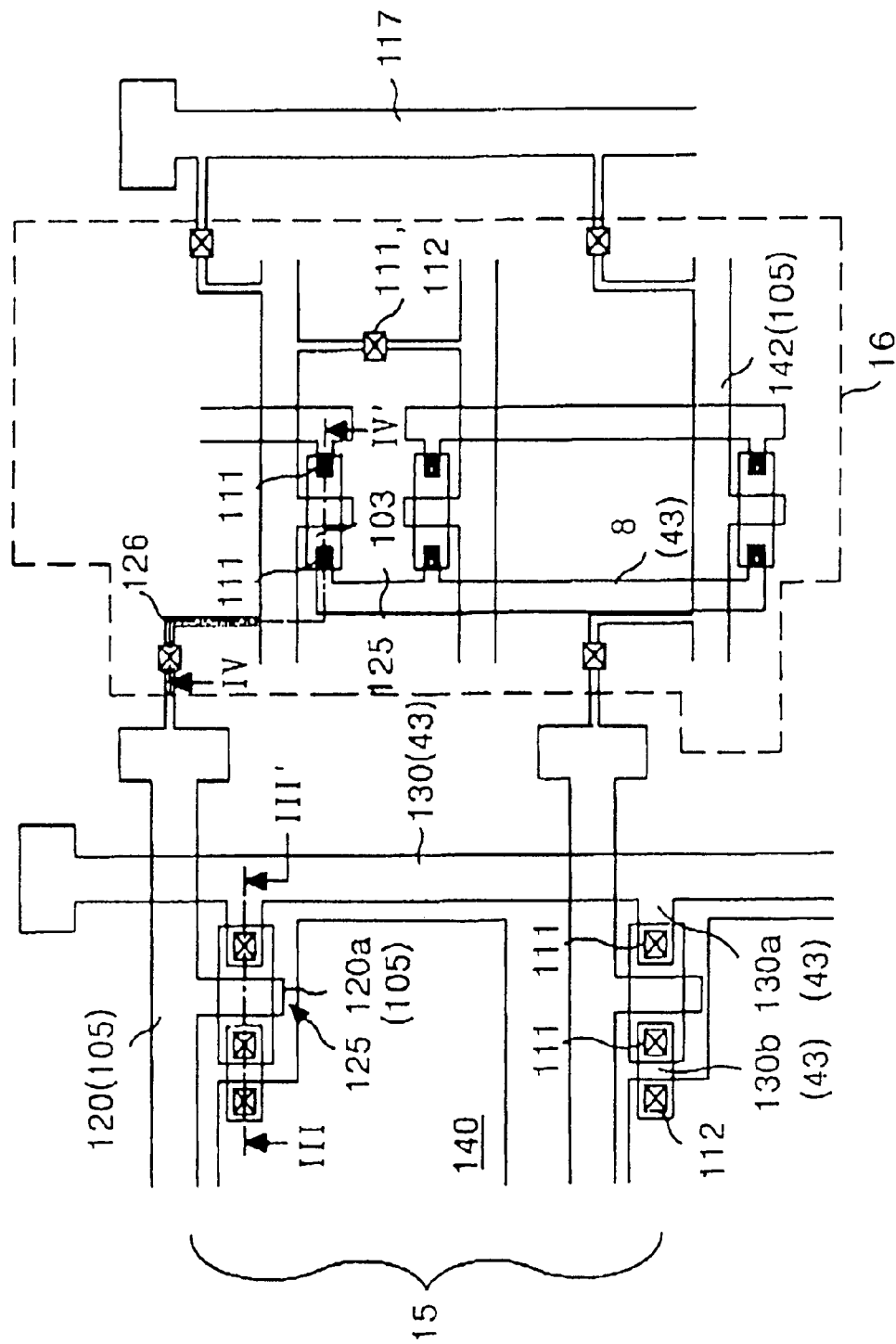
FIG. 9 is a plan view showing a configuration of a liquid crystal display substrate in which patterns of a gate metal and a data metal, etc. according to the present invention are provided.
Figure 10A:
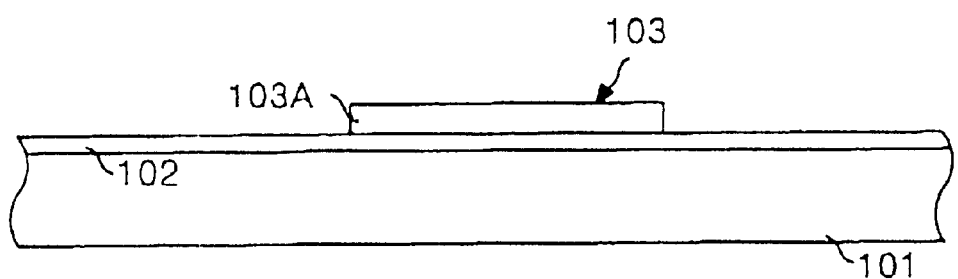
FIG. 10A to FIG. 10E are section views for representing a fabrication process of the liquid crystal display substrate taken along the III–III' line in FIG. 9.

First, as shown in FIG. 10A and FIG. 11A, a buffer layer 102 is provided on a transparent substrate 101 and an amorphous silicon (a-Si) layer is formed into a land-shaped pattern on the buffer layer 102 to provide semiconductor layer 103. The semiconductor layer can be a polysilicon. The semiconductor layer 103 includes a first semiconductor pattern 103A to be used for a TFT 125, and second and third semiconductor patterns 103B and 103C to be used for a redundancy material under the array gate bus line 120 and/or driver gate bus line 142 as shown in FIG. 8. The second and third semiconductor patters 103B and 103C are separated from each other. On the other hand, the second and third semiconductor patterns 103B and 103C can be removed under the gate bus lines 120 and 142.

Figure 10B:
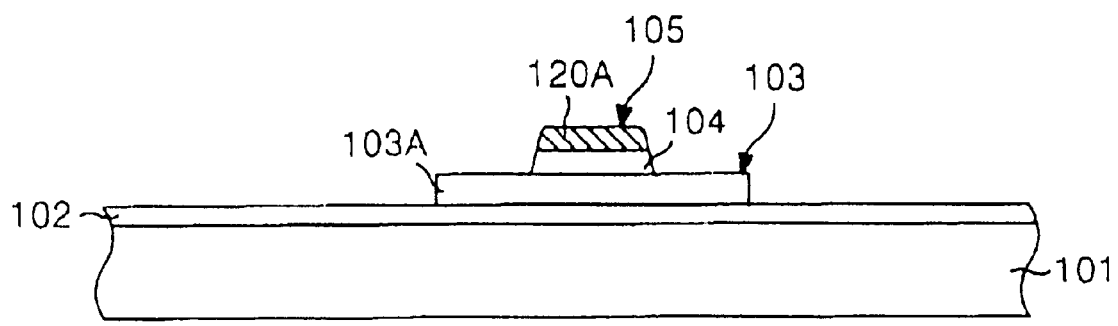
Figure 11B:
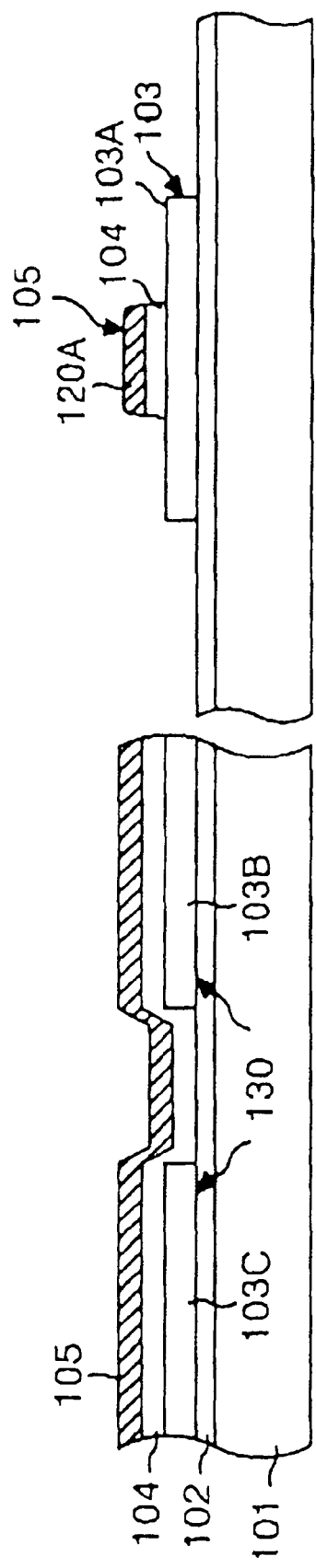
FIG. 11 A to FIG. 11E are section views for representing a fabrication process of the liquid crystal display substrate taken along the IV–IV' line in FIG. 9.

In turn, as shown in FIG. 10B and FIG. 11B, a first insulating film 104 made from $SiN_x$ or $SiO_x$ and a gate metal film 105 made from Cr, Mo or Al are sequentially disposed and then patterned into the same pattern shape. A gate electrode 120a constituting a portion of the gate metal film 105 is formed into a narrower width than the first land-shaped semiconductor layer 103A at a portion where TFT is formed by way of the first insulating film 104 on the semiconductor pattern 103A. A connecting metal film constituting another portion of the gate metal film 105 covers over the second and third semiconductor pattern 103B and 103C and the exposed buffer layer 102 therebetween.

As shown in FIG. 8, a pattern of the gate metal film 105 includes array gate bus lines 120, gate electrodes 120a, driver gate bus lines 142, and a gate start lead line 117 of a driver. The array gate bus lines 120 and the driver gate bus lines 142 and the gate start lead line 117 are formed in such a manner to be connected to each other with the aid of a connecting metal film 126. It is not necessary that all patterns constituting the gate metal film should be connected with each other. There are 768 array gate lines in XGA mode and more driver gate lines than array gate lines. The array and driver gate lines can be grouped and patterns among same group are connected to each other. The connecting metal film 126 is provided on the buffer layer 102 without being interleaved with the semiconductor layer 103.

After the gate metal film 105 was patterned, an ohmic contact layer is formed by doping each side surface of the first semiconductor pattern 103A with impurity ions using the patterned gate metal film 105 as a mask. In case the semiconductor layer is a-Si, the a-Si layer is crystallized before of after forming gate metal film 105.

Figure 10C:
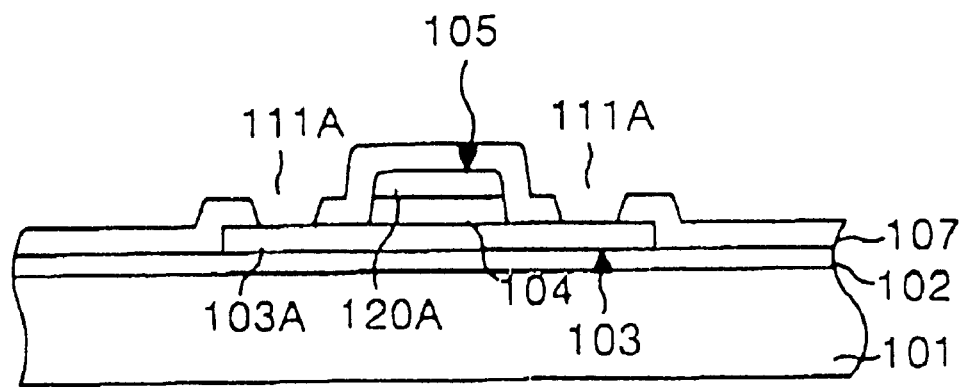
Figure 11C:
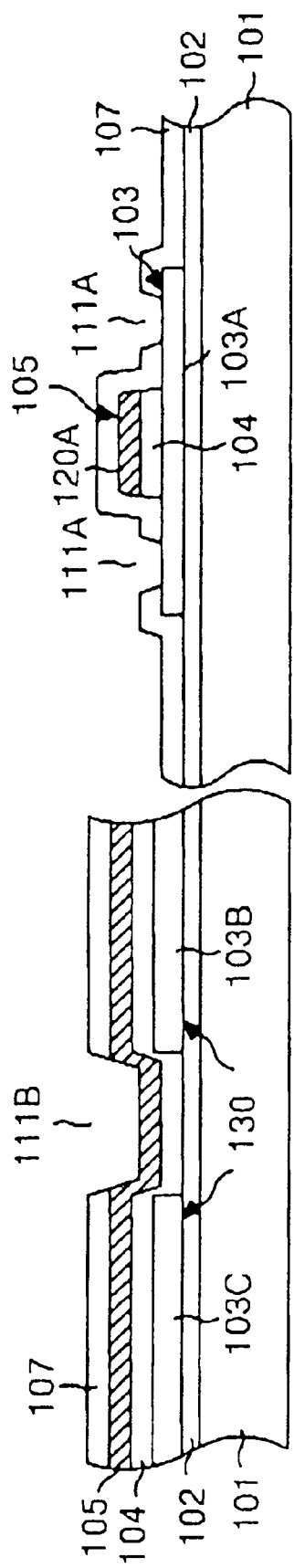

Next, as shown in FIG. 10C and FIG. 11C, a second insulating film 107 made from $SiN_x$ or $SiO_x$ is deposited on the entire surface of the substrate having the structure as described above. Each first contact holes 111A is formed in each side surface of the first semiconductor pattern 103A doped with the impurity. An opening portion 111B is formed to expose the surface of the connecting metal film 126, constituting the gate metal film 105, disposed on a portion between the second and third semiconductor patterns 103B and 103C.

Figure 10D:
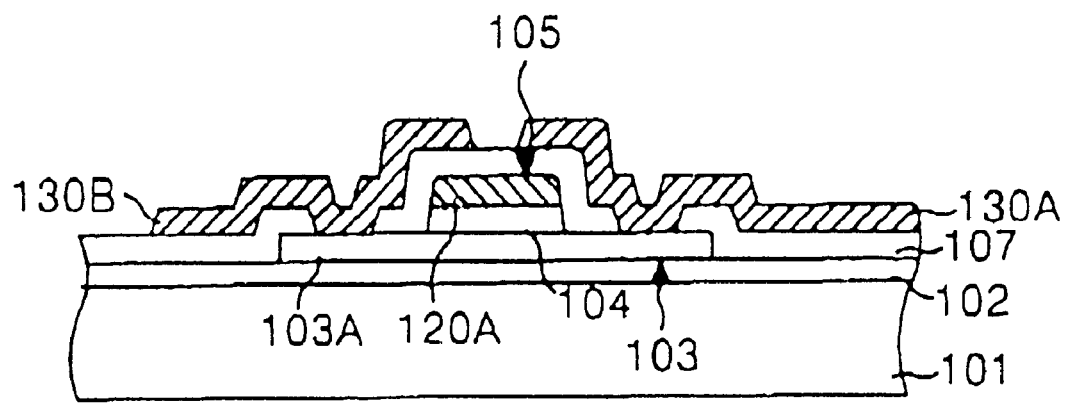
Figure 11D:
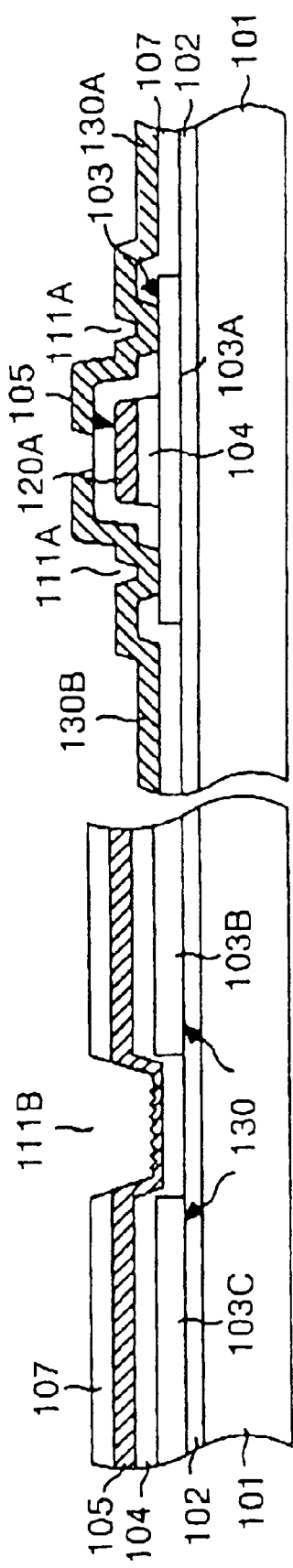

Subsequently, as shown in FIG. 10D and FIG. 11D, the data metal film 43 made from the same metal material as the gate metal film 105 is deposited. Metal for data metal film is inside the opening portion 111B. The data metal film 43 is patterned into a desired pattern to provide array data bus lines 130, source electrodes 130A and driver data bus lines 8. A portion of the connecting metal film 126 exposed by the formation of the opening portion 111B is etched by an etchant for the data metal film in such a manner to be separated into both sides, at a process of patterning the data metal film. Thus, a diameter of the opening portion 111B provided on the connecting metal film 126 must be lager than a width of the connecting metal film so as to separate the connecting metal film. Two metal layers, connecting metal film 126 and data metal film, should be etched in the opening portion 111B to separate the connection during etching process for data metal pattern. When the connecting metal film 126 is formed to have a width of less than 5 $\mu$m which is narrower than a width of the gate bus line 120, a defect is not generated. If the etching time is short, some of the connecting metal film 126 is remained unetched. On the other hand, if the period of patterning the data metal film is sufficiently long, the connecting metal film 126 exposed by the formation of the opening portion 111B can be is completely removed.

By the pattern formation of the data metal film 43, TFT's 125 are provided at the pixel array 15 and the driver circuit 16 of the LCD substrate.

If the TFT's 125 are configured in this manner, the second insulating layer 107 as a gate insulating layer is deposited in a state in which the gate metal film 105 has been connected by means of the connecting metal film 126, so that a potential difference caused by a static electricity is not generated at the gate metal film 105, that is, between the array gate bus line 120 and the driver gate bus line 142 of the driver to make an equal potential. Accordingly, an insulation breakage can not be generated on the second insulating film to reduce defects caused by a static electricity.

Figure 10E:
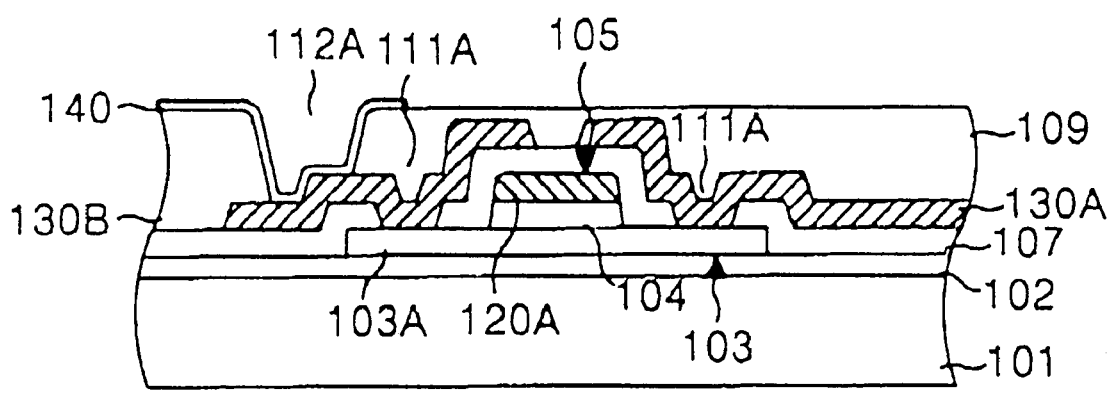
Figure 11E:
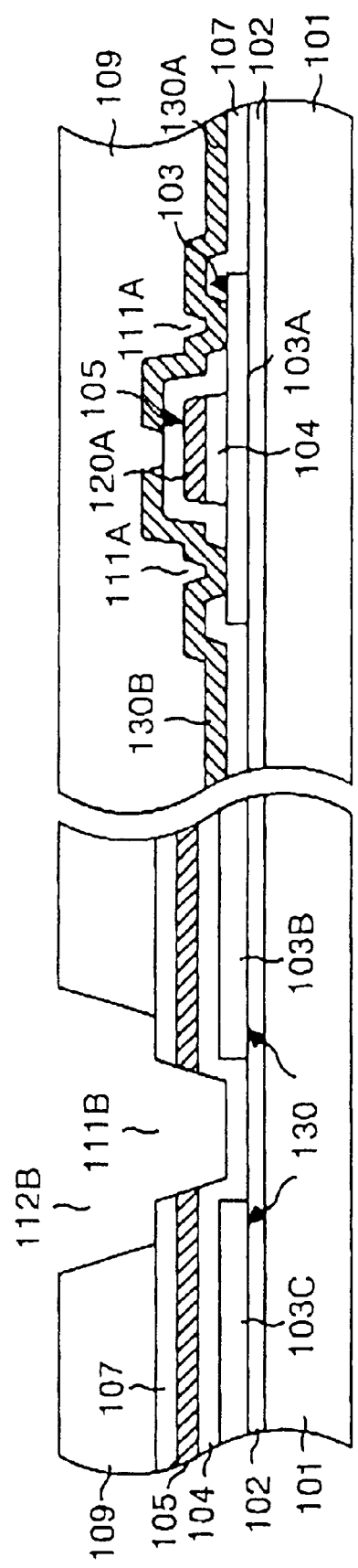

Finally, as shown in FIG. 10E and FIG. 11E, a third insulating film 109 made from an inorganic insulating material such as $SiN_x$ or $SiO_x$ or an organic insulating material such as polyimide, etc. is deposited. A second contact hole 112A is formed in a partial surface of the drain electrode 30B of the TFT 125 included in the pixel array 15. Also, a second opening 112B is formed in a portion of the first opening 111B of the connecting metal film 126 included in the driver circuit part 16. Thereafter, an ITO film is deposited at the entire surface of the third insulating film 9. The ITO film is then patterned to form the pixel electrode 140 of the pixel array. When the ITO film is patterned, the residue of the connecting metal film 126 exposed by the formation of the openings 111B and 112B is exposed to an etchant for the ITO film and etched completely in such a manner to be separated into both sides. The second opening 112B is preferably to have a diameter larger than that of the first opening 111B.

The residue of the connecting metal film 126 provided with the first opening 111B and the second opening 112B is again exposed to an etchant for patterning the ITO film in a process of forming the pixel electrode and is completely removed, thereby completely separating the connecting metal film into each side. In other words, the exposed connecting metal film 126 is not separated in a process of etching the data metal film, the exposed connecting metal film 126 is completely separated into each side by making an additional etching of the connecting metal film in a process of etching the ITO film to prevent a conduction between the gate bus lines 120.

Accordingly, the edge of the LCD substrate provided with the driver circuit has such a structure that the TFT's are arranged as shown in FIG. 11E and then the third protective film 109 is provided to cover the TFT's, whereas the pixel array thereof has such a structure that the TFT's are arranged as shown in FIG. 10E and then the pixel electrodes 140 contacting the drain electrodes of the TFT's are provided.

Figure 12:
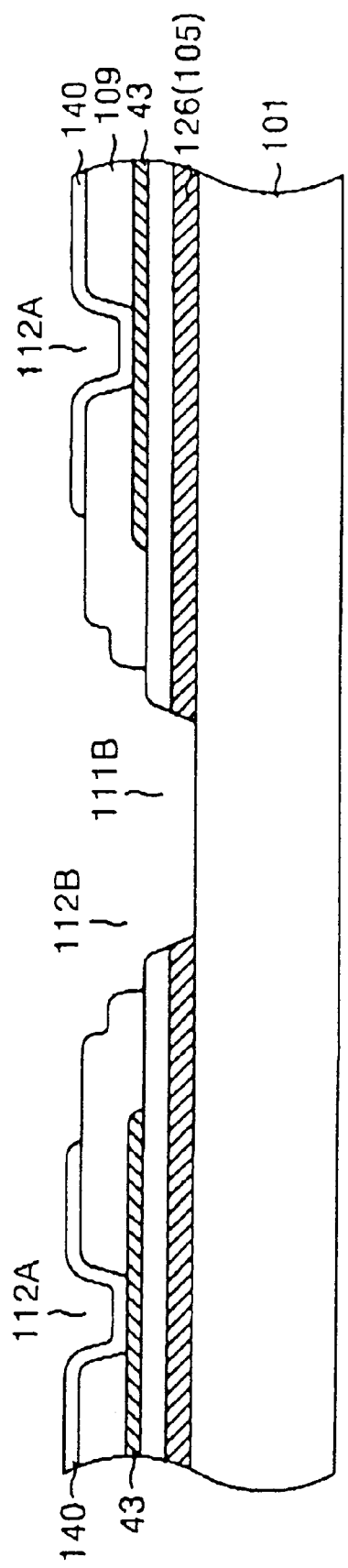
FIG. 12 is a section view for explaining an essential configuration of the liquid crystal display substrate according to the present invention.

FIG. 12 illustrates briefly the method for fabricating a liquid crystal display device according to the present invention. Referring to FIG. 12, a first metal film 105 is provided on a transparent substrate 101. The first metal film 105 is patterned in a desired pattern including gate metal bus lines and a connecting metal film 126 connected therebetween.

Next, an insulating film 107 is deposited on the entire surface of the transparent substrate 101 having the connecting metal film 126 thereon. A first opening 111B is formed in the insulating film 107 to expose a portion of the connecting metal film 126. A second metal film is patterned into another desired pattern such as a data metal film including data bus line, a drain electrode, a source electrode and so on. Simultaneously, the portion of the connecting metal film 126 exposed by the opening 11B is etched by an etchant for the second metal film 43, thereby allowing the connecting metal film 126 to be separated into each side. At this time, the exposed portion of the connecting metal film 126 via the opening 11B can not be removed. In this case, a residue of the exposed portion of the connecting metal film 126 exists on the transparent substrate 101.

Then, a protective insulating film 109 is formed on the entire surface of the transparent substrate 101 provided with the second metal film pattern 43. A second opening 112B is formed in the protective insulating film 109 to expose a portion of surface of the second metal film pattern 43 and an area separating the connecting metal film 126 into each side (or the residue of the exposed portion of the connecting metal film 126). Also, a third metal film is deposited on the protective film having the opening 112B. The third metal film is patterned into still another desired pattern such as a pixel electrode 140 connected to the data metal film 43. At this time, the residue of the exposed portion of the connecting metal film 126 is secondly etched by an etchant for the third metal film, thereby allowing the connecting metal film 126 to be completely separated into each side.

As described above, according to the present invention, even though a high voltage of static electricity is applied to the gate metal film in a deposition process of the insulating film, the gate metal films are conducted to each other with the aid of the connecting metal film to make an equal potential, thereby preventing an insulation breakage of the insulating film, etc. caused by a static electricity. Accordingly, a short between the gate metal film and the data metal film as well as a pattern defect is not generated. In addition, the connecting metal film is cut away with being exposed to an etchant when the data metal film and the ITO metal film is patterned, so that a fabrication process of the LCD substrate can be performed without an additional mask process to improve a fabrication yield.

It will be apparent to those skilled in the art that various modifications and variation can be made in the liquid crystal display device and method of fabricating the same of the present invention, without departing from the spirit or scope of the invention. Thus, it is intended that the present invention covers the modifications and variations of this invention provided they come within the scope of the appended claims and their equivalents.

What is claimed is:

1. A liquid crystal display device, comprising:
   a semiconductor layer formed on a substrate;
   a gate metal film formed at a center of the semiconductor layer, a first insulating film being formed between the semiconductor layer and the gate metal film, the gate metal film exposing two side surfaces of the semiconductor layer;
   a connecting metal film connected to the gate metal film and formed on the substrate;
   a second insulating film covering the gate metal film and the connecting metal film and provided with first contact holes to expose a part of each side surface of the semiconductor layer and the center portion of the connecting metal film;
   a data metal film provided on the second insulating film contacting the semiconductor layer by way of the first contact holes formed to expose a portion of each side surface of the semiconductor layer;
   a third insulating film covering the data metal film and the second insulating film and provided with a second contact hole to expose a part of the data metal film and the center portion of the connecting metal film; and
   a pixel electrode provided on the third insulating film by way of the second contact hole,
   said connection parts exposed by the first and second contact holes being separated from each other.

2. The liquid crystal display device according to claim 1, wherein the connecting metal film has a pattern width of less than 5 μm.

3. The liquid crystal display device according to claim 1, wherein the gate metal film and the data metal are made from the same metal material.

4. A method of fabricating a liquid crystal display device, comprising:
   patterning a first metal film to form a gate metal film and a connecting metal film for connecting the gate metal film;
   forming an insulating film to cover the gate metal film and the connecting metal film, and forming a first contact hole in the insulating film to expose at least one surface of the connecting metal film;
   forming a second metal film on the insulating film provided with the first contact hole;
   patterning the second metal film to provide a data metal film and, at the same time, to etch and primarily separate the connecting metal film by an etchant for the data metal film;
   forming a protective insulating film on the data metal film;
   forming a second contact hole on the protective insulating film to expose a partial surface of the data metal film and a separated area of the connecting metal film;
   forming a third metal film on the protective insulating film provided with the second contact hole, and
   patterning the third metal film to provide a pixel electrode connected to the data metal film and, at the same time, to secondarily separate the separated part of the connecting metal film by an etchant for the pixel electrode.

5. A method of fabricating a liquid crystal display device, comprising:
   forming a semiconductor layer on a substrate;
   disposing a first insulating film and a first metal film on the substrate provided with the semiconductor layer, and patterning the first insulating film and the first metal film into almost identical shapes to provide a connecting metal film for connecting the first metal film to the gate metal film in such a manner that at least part of the gate metal film is interleaved with the first insulating film to be overlapped with the center portion of the semiconductor layer;

doping each side surface of the semiconductor layer with impurity ions using the gate metal film and the connecting metal film as a mask;

forming a second insulating film on the substrate in which the semiconductor layer is doped with the impurity ions;

forming a first contact hole in the second insulating film to expose each side surface of the semiconductor layer doped with the impurity ions and a partial surface of the connecting metal film;

forming a second metal film on the substrate provided with the first contact hole and then etching the same to form a pattern of the data metal film contacting the semiconductor layer doped with the ions and, at the same time, etching the exposed part of the connecting metal film to separate the connecting metal film;

forming a third insulating film on the substrate in which the connecting metal film has been separated, and forming a second contact hole in the third insulating film at a part of the data metal film and the separated area of the connecting metal film; and forming a third metal film on the third insulating film provided with the second contact hole and then etching the same to provide a pattern of the pixel electrode contacting a part of the data metal film, and making an additional etching of the separated connecting metal film.

6. The method according to claim 5, wherein the connecting metal film has a pattern width of less than 5 µm.

7. The method according to claim 5, wherein the gate metal film and the data metal are made from a same metal material.

* * * * *